United States Patent

Hahn

[15] 3,665,618

[45] May 30, 1972

[54] INSTRUCTIONAL GAME

[72] Inventor: Margaret K. Hahn, 3910 E. Belmont, Fresno, Calif. 93702

[22] Filed: Aug. 17, 1970

[21] Appl. No.: 64,187

[52] U.S. Cl. ..................................35/35 H, 273/135 BC
[51] Int. Cl. ...................................................G09b 17/00
[58] Field of Search...............................35/35 R, 35 H, 35 C; 273/135 BC

[56] References Cited

UNITED STATES PATENTS

| | | | |
|---|---|---|---|
| 3,464,124 | 9/1969 | Lynd | 35/35 H |
| 3,412,483 | 11/1968 | Jacobs | 35/35 C |
| 3,402,694 | 9/1968 | Christman | 35/31 B X |

FOREIGN PATENTS OR APPLICATIONS

| | | | |
|---|---|---|---|
| 491,948 | 4/1953 | Canada | 35/35 H |

*Primary Examiner*—Wm. H. Grieb
*Attorney*—Huebner & Worrel

[57] ABSTRACT

An instructional game for use by "beginning readers" in promoting early perception of letter patterns, particularly those including a vowel. The game is characterized by a plurality of master boards, each including thereon a compilation of words selected from a defined class of words, each word having a letter pattern common to the class and an established phonetic value, a multiplicity of similarly configured game boards, each being adapted to receive therein a replaceable game card, a plurality of replaceable game cards, each bearing a partial list of words selected from a given master board and displayed in parallel rows, and a plurality of word markers associated with each of the game boards. The game is played as words are chosen from a given master board, enunciated by a game director and simultaneously marked on game boards by a class of participants, through a digitation of the word markers, in order that a game winner be determined as the markers are by a winning participant grouped to conform to a predetermined pattern.

19 Claims, 19 Drawing Figures

PATENTED MAY 30 1972 3,665,618

MARGARET K. HAHN
INVENTOR

Huebner & Worrel
ATTORNEYS

MARGARET K. HAHN
INVENTOR

Huebner & Worrel
ATTORNEYS

MARGARET K. HAHN
INVENTOR

Huebner & Worrel
ATTORNEYS

# INSTRUCTIONAL GAME

BACKGROUND OF THE INVENTION

The invention relates to a unique game and more particularly to an instructional game having utility in precisely and systematically approaching a study of letter patterns and related sounds. The game is provided as a teaching aid for those engaged in the instruction of "beginning reading" wherein a promotion of early recognition and perception of letter patterns is of primary concern.

It is an accepted fact that learning to read is a complex process which is not fully understood, even by those engaged in instruction of reading techniques. However, it also is recognized that written symbols represent spoken language and consequently reading involves a use of "taught" skills, unique to each individual and developed through intensive instruction and repetitious practice.

One of the techniques heretofore employed as an aid to instructors in teaching reading skills relies quite heavily upon a use of "sight words." This technique, in many respects, is quite practical, however, it often fails to provide "keys" to advanced reading. In order to overcome this difficulty another technique developed around a phonetic analysis of words currently within a student's aural vocabulary also has been used quite satisfactorily. It has been postulated that a student's preschool vocabulary may include as many as ten thousand words. Hence, by applying techniques of phonetic analysis to such works there is provided an opulence of "keys" which establish a broad basis for an orderly progression in reading skills.

Unfortunately, there is a shortage of educators qualified to develop programs employable in teaching phonetic analysis of words, as well as a lack of qualified teachers. This has, in part, been responsible for the current controversy relating to the benefits derivable from a use of phonetic analysis of letter patterns in teaching beginning reading skills.

SUMMARY OF THE INVENTION

It is therefore an object of the instant invention to provide a simple, unique game for use in teaching reading skills.

Another object is to provide an instructional game, having simplified rules, which can be played by those of a tender age, for use in promoting perception of letter patterns and word recognition.

It is another object to provide a game wherein a beginning reader is afforded an opportunity to utilize his skill in letter pattern recognition in a competitive environment.

Another object is to provide a simplified game having particular utility as a teaching aid for instructional purposes in promoting word recognition.

Another object is to provide a simplified game having minimal rules and requiring minimal dexterity and which simultaneously can be played by a variable number of students as they are taught reading skills.

Another object is to provide a simplified game which simultaneously can be played by entire classes of beginning readers for systematically developing skills in the application of phonetic principles in developing reading techniques.

Another object is to provide an instructional game, particularly suited for use in a class-response teaching situation, adapted for use in developing word recognition and comprehension through a phonetic analysis of a beginning reader's aural vocabulary.

These and other objects and advantages of the instant invention are achieved through a simplified game wherein a relatively large number of beginning readers learning in a "fun environment," simultaneously are provided with an opportunity to utilize techniques of phonetic analysis in attacking words within their aural vocabulary for the specific purposes of developing reading skills.

DESCRIPTION OF THE PREFERRED EMBODIMENT

Figures 1, 2, 3, 4, 19:
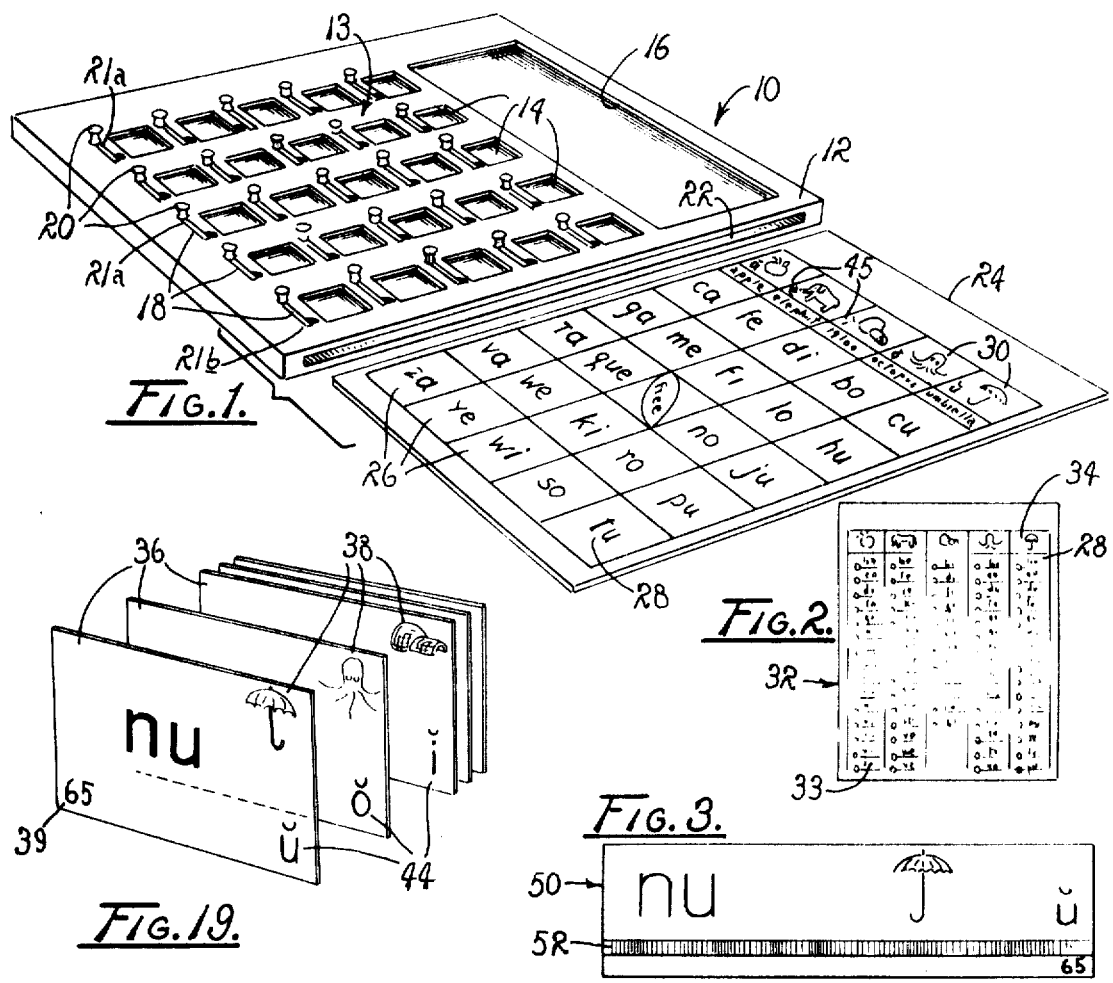
FIG. 1 is an exploded, perspective view of a game board which is employed in playing the game of the instant invention, illustrating a manner in which the game board is assembled to include a selected game card.
FIG. 2 is one form of a master board adapted to be utilized by the game of the instant invention.
FIG. 3 illustrates a "sight" card, employable as an accessory in utilizing the game of the instant invention for teaching reading skills, which has disposed thereon a recording medium for recording selected word patterns or words in an electronically retrievable form.
FIG. 4 depicts a type of machine which can be employed in "playing" the game of the instant invention.
FIG. 19 illustrates a deck of "sight" cards which is employable as an accessory in utilizing the game of the instant invention for purposes of teaching reading skills.

Referring now to the drawings, wherein like reference characters designate like or corresponding parts throughout the several views, there is shown in FIG. 1 a game board 10, which, preferably, is employed in playing the game of the instant invention.

As illustrated, the game board 10 includes a rigid plate 12 having a planar playing face 13 within which is provided an ordered array of similarly configured apertures 14 and an elongated window 16. The apertures 14 are arranged in columns, while the window 16 is extended across the playing face 13, of the board 10, in a manner such that the columns appear to depend from a common window.

In practice, the plate 12 is so constructed as to include therein a plurality of transversely oriented slots 18, each being singly associated with a given aperture 14. Each of the slots 18 has seated therein a laterally displaceable marker 20 adapted to be digitated by a student for purposes of displacing the marker from a given initial position, at the left of the slot, designated 21a, to another position, designated 21b, located at the extreme right of slot 18 and indicated with a black 90° arc. Each of the game boards 10 further includes a receiving slot 22 communicated with an opening, not designated, paralleling the playing face 13 for receiving therein a preprinted game card 24.

The face of each of the cards 24 is provided with a multiplicity of parallel rows 26 of words or word portions which include letter patterns 28. These patterns are selected on the basis of a common characteristic. In practice, this characteristic is established by a pattern of vowels and related consonants appearing in each word.

Each of the patterns 28 is so oriented with respect to the remaining patterns appearing on the board as to register with a single aperture 14 when the card 24 is received within the board 10. Near the top of each of the rows 26 there is associated an image 30 having a readily recognizable common name which includes a letter pattern having a phonetic value, or sound, indicative of the phonetic value of the letter patterns appearing within the associated row. The images 30 are so positioned on the faces of the game cards 24 as to register with the window 16 and be observed simultaneously by a game participant. Preparatory to playing the game, a card 24 is inserted into the slot 22, of each game board 10 being employed, in a manner such that the images 30 simultaneously become visible through the window 16, while each of the letter patterns 28 singly is presented to view through a given one of the apertures 14. In practice, each of the game cards 24 includes a compilation of letter patterns which is unique to that card.

All of the compilations of letter patterns 28, for all of the game cards 24, are compiled and appear on a common master board 32. The letter patterns of these compilations are grouped in parallel rows 33, similar to the manner in which the letter patterns are grouped for each of the cards 24. With each of the rows 33 there is associated an image 34, similar to one of the images 30, and similarly identified the row 33 with which it is associated. Hence, it is to be understood that each master board 32 includes a list of letter patterns which is inclusive with respect to the compilation of letter patterns appearing on all related game cards 24. As a practical matter, each image 30 is identified by a convenient vowel indicator 34', and is employed by sounding the vowel.

As a matter of convenience in identifying letter patterns selected during the course of play, each master board 32 is provided with slot-mounted buttons 35 seated in slots 35', associated with the letter patterns and adapted to be displaced by a game director, in a manner similar to that in which the buttons 20 are displaced by a participant, in order to identify words having been selected by the director.

In playing the game, each participant is provided with one of the game boards 10. If desired, the more astute participants can be provided with more than a single board 10 in order to avoid boredom. A game director, preferably an instructor, selects a master board 32 containing a compilation of letter patterns to be studied, and then provides each participant with a related game card which bears a compilation of appropriate letter patterns 28. The student now inserts the provided game card within his game board. From the master board 32 the director selects words containing the letter patterns 28, and enunciates the words in a manner such that the selected letter patterns are projected with particular clarity. The director now identifies for the participants a row 26 within which the selected letter pattern can be found, through a reference to an image 30, and to its respective long or short vowel, as it appears on the master board 32 and card 24. Having selected a word, the director marks its use by moving the button 35, from an initial position, designated 35a, along the face of the master board to a final position 35b at the extreme right of slot 35', indicated by a 90° black arc. When so positioned the word so designated is then recognized as being a "previously selected" word and is used to so indicate. The students, in turn, and upon observing and recognizing the presence of the enunciated letter patterns 28 or words, simply digitate the appropriate buttons 20 for thereby advancing the buttons along their associated slots 18, from the initial position 21a to the final position 21b, thus marking the positions of each of the letter patterns 28 enunciated and present on the game boards 10.

As is the case with Bingo, Lotto, and similar games, the first participant to digitate and thus rearrange a given number of buttons 20 into a group of a predetermined configuration becomes an established winner. Of course, verification of the letter patterns employed preferably is required. Verification is effected simply by requiring that the participant "read-back" the selected letter patterns, enunciating in the manner of the game director. Hence, as play of the game is in progress, the participant is afforded an opportunity visually, as well as audibly, to recognize selected letter patterns.

Where desired, it is practical to employ "sight cards" 36, FIG. 19, which bear images 38 duplicating the images 30 appearing on the individual game cards 24 and the images 34 appearing on the master board 32. The cards 36 are identified by numerals 39 which correspond to numerals 43 appearing on the master board 32. Numerals are not employed with the cards 24 since the numerals 43 displayed on cards 36 correspond only with the numerals appearing on the master board 32 and are solely for the convenience of the instructor in checking off words or letter patterns 28 as they are selected and used. When employing sight cards 36, selected images 38 and vowel indicators, designated 44, can be referred to as the cards are displayed to a group or class of students. This is accomplished simply by holding aloft one of the selected cards 36, drawing attention to an image 38 and to the vowel indicator 44 before carefully enunciating or pronouncing the word or letter pattern 28 displayed on the card 36.

Electronic teaching aids also can be employed with relative ease. For example, there currently are available various types of "recording and play-back" systems which have utility in classroom instruction. One such system is that commonly called a card-reader system. Where desired, a card-reader 48, FIG. 4, is coupled with a plurality of play-back stations 49 at which participants are located for purposes of "playing" the game in a manner similar to that aforedescribed.

In order to more fully utilize the card-reader 48 a prepared or pre-recorded set of cards 50, FIG. 3, can be employed. These cards correspond and are identical to "sight" cards 36, FIG. 19, except for the feature that cards 50 are wider and include thereon strips of magnetic tape 52, or a similar medium, which is utilized to electronically record a director's instruction. The cards 50 can then be inserted into the card-reader 40 and simultaneously be employed by a multiplicity of students. It should be readily apparent that the game also can be played simultaneously by a large number of mutually remote students.

It will be appreciated that the rules of the game are relatively simple. However, the game is so designed as to be employable in an environment wherein students advance to increasingly difficult plateaus of reading and comprehension skills. Hence, the game includes a plurality of master boards 32, each having associated therewith a relatively large number of game cards. Consequently, the game is provided with a large number of categories of letter patterns, each category being representative of another level of student skill to which a student can progress upon having become proficient at the preceding level.

Since the master board 32 and related game cards 24 are characterized according to the letter patterns 28, appearing in the rows 26 and 33, a student, by observing the fundamental characteristics for each succeeding category of letter patterns, progressively develops perceptual skills in word recognition and perception.

Because a vowel is a "key" to recognizing syllables, as well as words made up of syllables, an introduction of phonetic analysis normally begins with a study of the vowels "a," "e," "i," "o" and "u," and the characteristics of the vowels which serve to distinguish the vowels from the consonants or other letters of the alphabet.

In the beginning, participants or students need only a most simplified explanation of the letters of an alphabet. For example, they can be advised that the letters of the alphabet are quite similar to animals of a farm yard in that they all have names and make sounds. There are, of course, some letters and animals which make but one sound, and there are others that make more than one sound. In order to illustrate this phenomenon, the students are told that a consonant is similar to a cow, which can only say "Moo," and to sheep, which can only say "Baa." However, a vowel makes more than one sound and can be compared to a dog that can say "Woof" or "Grrr" and a cat that "Meows" but can also say "Pfsst."

When the vowels are presented to a beginning reader, he will be better able to recall the distinction of long and short vowels if initially he is advised that a long vowel normally says its name and is called a long vowel because it says its name for a long time, while a short vowel is short because it makes a very brief sound or short sound. Normally, this explanation sufficiently is adequate to satisfy a beginning reader and will offer a tangible meaning and reason for a study and examination of the phonetic values or sounds of long and short vowels.

Hence, beginning readers, particularly those of tender ages, as well as older students suffering from chronic inability to develop perceptual and reading skills, readily are able to employ the game of the instant invention for purposes of developing greater skills in reading and comprehension.

In order to simplify the description of the invention, the games can be considered to be included in a series of categories, representing preselected levels of difficulty. Each category includes a number of games, each of which is designed to call attention to certain letter patterns unique to that game. The categories then sequentially are presented to the student as he achieves excellence in each succeeding category.

CATEGORY I A

Figure 5:
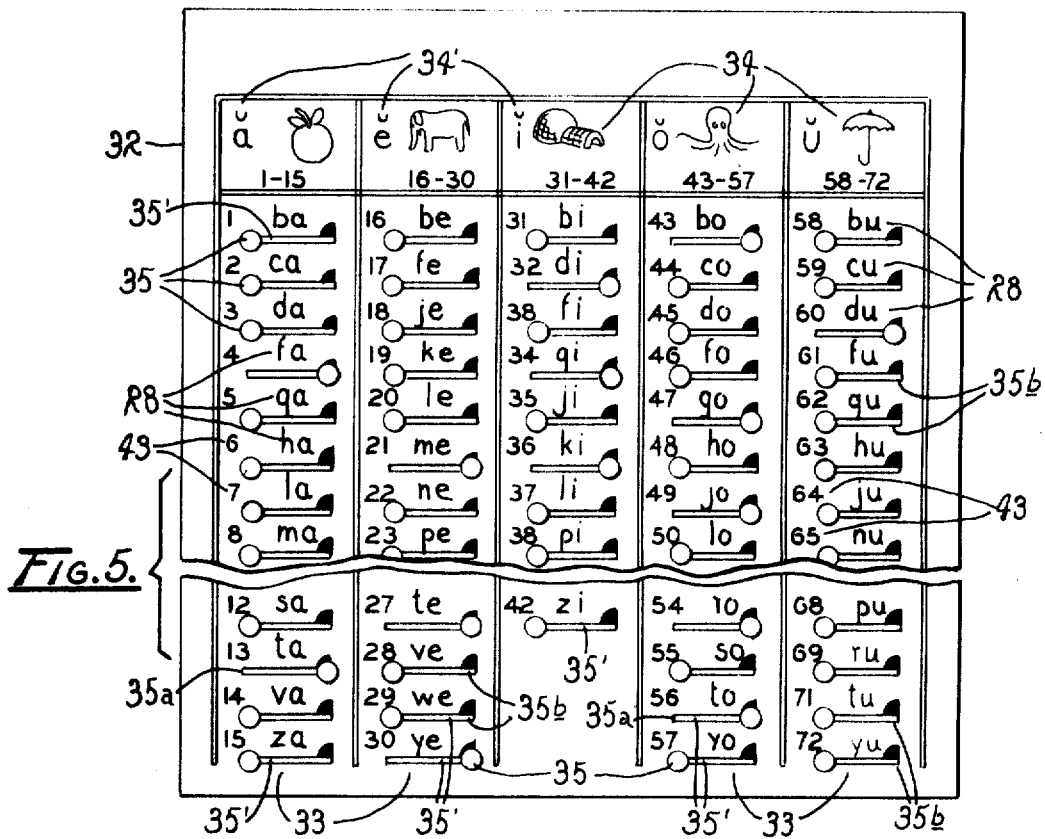
FIG. 5 depicts, on an enlarged scale, the master board of FIG. 2.
Figure 6:
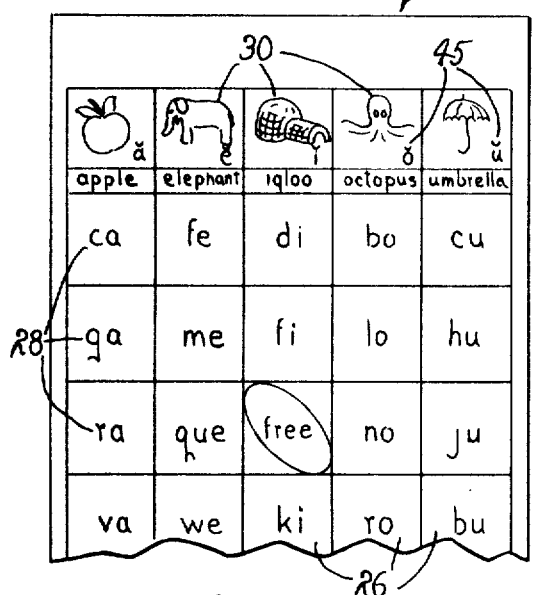
FIG. 6 and FIG. 7, together, illustrate a pair of game cards employable with a common master board.
Figure 7:
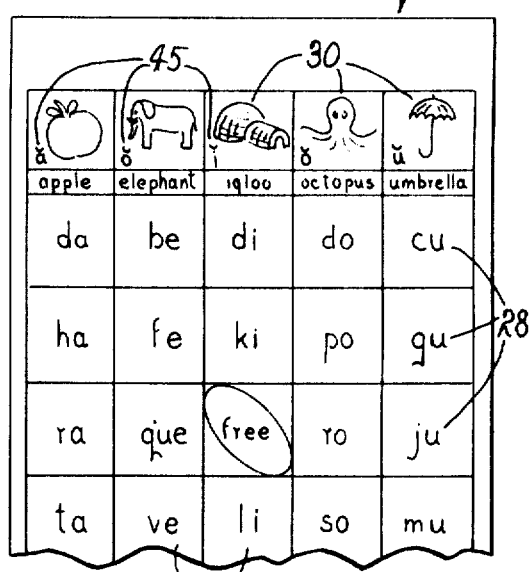

The game first played utilizes a first category of letter patterns, hereinafter designated Category I A, FIGS. 5 through 7. This category of letter patterns serves as a beginning category and is employed in teaching various vowel patterns to be emphasized.

Letter patterns selected as Category I A patterns include a vowel pattern having a common characteristic which comprises initial consonants coupled with medial short vowels so that the consonants can be perceived in combination with the short vowels in order to avoid initially teaching sounds in isolation, a practice which may result in sound distortion of consonants. Letter patterns indicated by each card 24 include all initial consonants except the letter X.

As a matter of convenience, the following is a non-exclusive compilation of letter patterns for use as Category I A letter patterns:

| ă | ĕ | ĭ | ŏ | ŭ |
|---|---|---|---|---|
| ba | be | bi | bo | bu |
| ca | fe | di | co | cu |
| da | je | fi | do | du |
| fa | ke | gi | fo | fu |
| ga | le | ji | go | gu |
| ha | me | ki | ho | hu |
| la | ne | li | jo | ju |
| ma | pe | pi | lo | lu |
| pa | que | qui | mo | mu |
| qua | re | ti | no | nu |
| ra | se | wi | po | pu |
| sa | te | zi | ro | ru |
| ta | ve |  | so | su |
| va | we |  | to | tu |
| za | ye |  | yo | yu |

These letter patterns are provided on the master board 32 and on the game cards 24 and employed in the manner aforedescribed. Once a student satisfactorily has progressed through the letter patterns of Category I A, he can advance to a more difficult level of letter patterns, hereinafter designated I B pattern.

Thus the student, through his participation in the game of the instant invention, is provided with a "key" and rendered capable of progressing in his visual perception, his aural recognition and oral reproduction of the selected letter patterns of Category I A to those of Category I B.

CATEGORY I B

Figure 8:
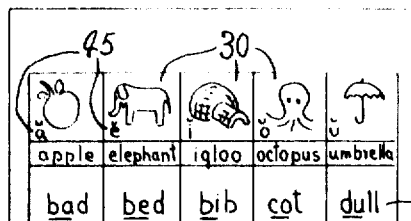
FIGS. 8 through 18 illustrate game cards, similar to the game cards of FIGS. 6 and 7, bearing differing letter patterns.

The Category I B letter patterns are provided on a game board 32 and an associated plurality of game cards 24, in a manner quite similar to that hereinbefore discussed. Letter patterns representative of Category I B appear on game cards 24, depicted in FIG. 8. These patterns include the letter patterns of Category I A, but further include a common characteristic of a final or ending consonant which is utilized to provide commonly recognizable words. The letter patterns of Category I B are included in words having letter patterns intended to call attention to the initial consonants in connection with the medial short vowels and ending consonants, which are added to the short vowels. Each card 24 illustrates all initial consonants except the letter X.

A master board 32 is provided with a compilation of Category I B words, while each of the game cards 24 is provided with only selected portions of the compilation in the manner aforedescribed.

The following is a non-exclusive compilation of letter patterns for use as Category I B letter patterns:

| ă | ĕ | ĭ | ŏ | ŭ |
|---|---|---|---|---|
| bad | bed | bib | bog | bug |
| cab | fed | dig | cot | cud |
| dab | jet | dim | dog | cull |
| gas | keg | fit | god | dull |
| had | mess | jig | hog | fun |
| map | neck | kin | loss | gum |
| quack | pen | kiss | moss | hut |
| rap | quell | lid | nod | jug |
| sad | red | quick | pot | luck |
| tag | ten | tip | rob | mud |
| van | vet | wig | rot | nut |
| wag | vex | zip | sob | puff |
| wax | web |  | sock | rug |
| zag | yell |  | top | run |
| zax | yes |  | yon | sum |
|  |  |  |  | tub |

CATEGORY I C

Figure 9:
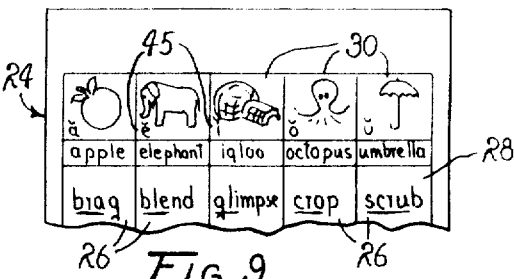

From Category I B a student can progress to the letter patterns designated Category I C, as illustrated by cards 24 of FIG. 9.

In this category of letter patterns there is included basic initial consonant blends. A list of typical words illustrating and incorporating such letter patterns is provided as follows:

| ă | ĕ | ĭ | ŏ | ŭ |
|---|---|---|---|---|
| brag | blend | drift | block | blush |
| clam | clef | glimpse | bronze | brush |
| crack | fled | grin | clock | crumb |
| dram | fresh | plinth | crop | frump |
| flat | glen | scrimp | drop | glum |
| grand | pledge | sniff | flock | gruff |
| prank | press | spin | frost | pluck |
| scant | sketch | squint | prod | scrub |
| scratch | sled | still | scotch | scuff |
| skat | smell | strip | slob | skull |
| slap | spend | swim | smock | smug |
| snag | squelch | twist | spot | snub |
| sprang | stress |  | stop | stunt |
| tram | swell |  | strong | swung |
| twank | twelve |  | trod | truck |

CATEGORY I D

Figure 10:
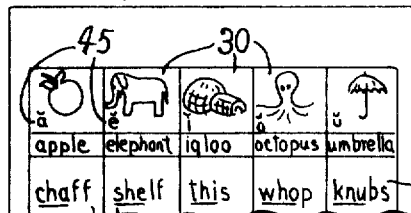

A fourth category of letter patterns, hereinafter designated Category I D pattern, appearing on game cards 24 depicted in FIG. 10, represents a fourth level of difficulty to which a student can expect to progress.

The Category I D patterns have an identifying common characteristic of initial consonant diagraphs combined with a medial short vowel to which are attached ending consonants. Hence, a student, by mastering the letter patterns of Category I D is prepared to advance an additional step in his educational progress.

A representative compilation of words which include Category I D letter patterns is provided as follows:

| ă | ĕ | ĭ | ŏ | ŭ |
|---|---|---|---|---|
| chaff | check | chick | chock | chuck |
| chance | chest | chill | chop | chum |
| chap | knell | knit | knob | chump |
| chat | phlegm | shift | knock | knubs |
| gnash | shed | ship | knot | shrub |
| gnat | shelf | shrink | phlox | shrug |
| knack | shelve | this | shock | shun |
| shaft | shred | thrift | shod | shut |
| shag | them | thrill | shot | thrum |
| than | then | whisk | thong | thrush |
| that | thresh | whisp | throb | thrust |
| thrash | whelk | whist | throng | thud |
| thwack | when |  | whop | thug |
| wrack | wreck |  | wrong | thumb |
| wrath | wretch |  | wroth | thump |

CATEGORY II A

Figure 11:
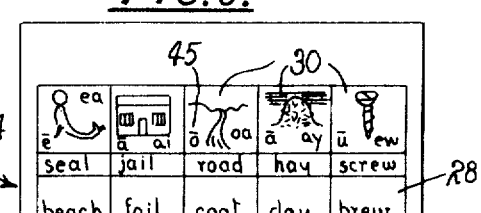

Having mastered the letter patterns of Category I D, a student can progress to a study of a category of letter patterns having, in common, letters forming vowel digraphs and hereinafter designated II A, and as illustrated by the game card 24 of FIG. 11. Category II A letter patterns include vowel digraphs not limited to vowel digraphs having a sound of a "long" vowel, but include vowel diagraphs having a predominant sound and commonly encountered by a student. The letter patterns of Category II A are utilized in the manner aforedescribed.

The following compilation is representative of the list of words including Category II A letter patterns:

| ea | ai | oa | ay | ew |
|---|---|---|---|---|
| beach | bait | boast | bay | blew |
| beat | fail | boat | bray | brew |
| each | maid | coal | day | crew |
| eat | main | coast | fray | dew |
| heal | paid | coat | gray | drew |
| meal | pain | float | hay | few |
| peach | praise | goat | jay | flew |
| preach | raid | moat | may | grew |
| reach | rain | oar | pay | mew |
| real | stain | roan | play | new |
| seam | tail | roast | pray | shrewd |
| steal | trail | toast | ray | slew |
| teach | train | | spray | spew |
| treat | waist | | stay | stew |
| weak | wait | | way | threw |

CATEGORY II B

Figure 12:
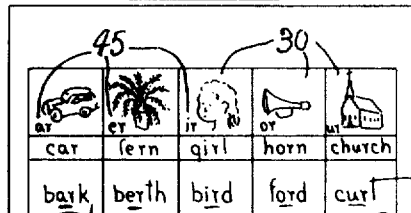

The next group of letter patterns frequently encountered in playing the game of the instant invention is patterns including, in common, the so-called "murmur diphthongs." Murmur diphthongs are formed through a coupling of a short vowel with the letter "r." Such letter patterns are illustrated by the letter patterns as depicted by the cards 24 of FIG. 12. It is noted that Category II B letter patterns are not diphthongs in the truest sense of the word but often are so-called.

The following list of words includes letter patterns commonly found in Category II B letter patterns:

| ar | er | ir | or | ur |
|---|---|---|---|---|
| bark | berg | birch | born | burn |
| card | berth | bird | cord | church |
| dark | fern | chirp | ford | churl |
| farm | germ | dirk | fork | churn |
| guard | her | dirt | form | curb |
| harm | herb | firm | fort | curl |
| jar | herd | first | forth | furl |
| lard | jerk | firl | horse | lurch |
| parch | merl | mirth | morn | purl |
| park | perch | squirt | porch | slur |
| snarl | perk | stir | port | slurp |
| spark | pert | twirl | storm | spur |
| thwart | stern | | torn | spurn |
| yard | term | | tort | spurt |
| yarn | tern | | worn | turn |

CATEGORY II C

Figure 13:
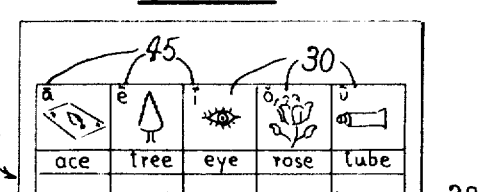

As a student thus progresses and, accordingly, advances in his learning processes, he is introduced to letter patterns which form "vowel digraphs." A digraph can be defined as two letters having a single phonetic value or sound. Such letter patterns are arranged in a category designated Category II C, as depicted by card 24, FIG. 13.

In utilizing Category II C letter patterns attention is focused on a common characteristic of letter patterns having the sound of "long" vowels. The Category II C words are employed in the manner aforedescribed. A compilation of words including vowel digraphs is provided as follows:

| ā | ē | ī | ō | ū |
|---|---|---|---|---|
| break | ceil | cry | beau | beauty |
| eight | creak | die | bowl | blue |
| fail | grieve | fight | crow | canoe |
| gauge | key | guide | door | coup |
| great | knee | guise | dough | feud |
| paint | meat | guy | eau | food |
| pray | oui ja (we-ja) | pie | foe | fruit |
| prey | people | rye | go | feul |
| quaint | piece | scythe | oh | poor |
| sleigh | pier | sigh | road | rouge |
| stain | quay | sign | sew | shoe |
| stay | scream | sleight | soul | soup |
| straight | siege | | toe | stew |
| they | spiel | | troll | two |
| whey | weird | | yeoman | view |

CATEGORY II D

Figure 14:
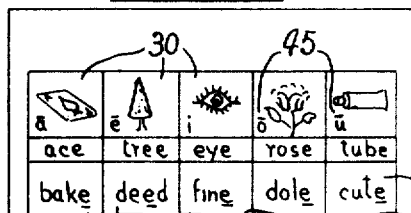

A further category of letter patterns is illustrated by the game card 24 of FIG. 14. In playing the game of the instant invention, in the manner aforedescribed, employing the letter patterns selected from Category II D words, it is intended that participants become familiar with the letter patterns having, in common, the so-called "silent e."

The following list of words includes letter patterns which are fairly representative of the Category II D letter patterns:

| ā | ē | ī | ō | ū |
|---|---|---|---|---|
| bake | beet | crime | bode | butte |
| baste | creep | fine | cove | cube |
| cake | deed | kite | dole | cute |
| came | feed | mile | dose | dude |
| change | feet | pipe | hole | dune |
| hale | jeep | ride | home | flume |
| jade | meek | slide | mole | flute |
| pane | need | spine | pole | fuse |
| paste | peel | strike | quote | huge |
| quake | reed | stripe | robe | juke |
| range | seed | thine | rode | June |
| safe | seem | white | scope | mute |
| spade | seet | | smoke | rude |
| stale | steep | | stole | ruse |
| waste | tree | | wrote | truce |

CATEGORY II E

Figure 15:
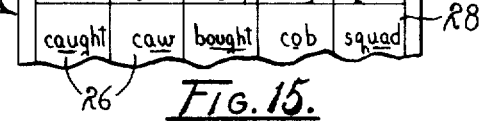

Another category of letter patterns often employed is that hereinafter designated Category II E. This letter pattern includes the common characteristic of the phoneme "ah" which is formed by several different letters or combinations of letters such as "au," "aw," "qua," "ough" and "o." Such patterns are illustrated by the game cards 24 of FIG. 15.

In employing the letter patterns of Category II E, in the manner aforedescribed, the phoneme "ah" is of interest. Consequently, the master board 32 and each of the game cards 24 include words which incorporate letter patterns having the phonetic value of "ah."

The following list of words, which is deemed non-exclusive, include the letter pattern of Category II E words and are provided as follows:

| au | aw | ough | ŏ | ua |
|---|---|---|---|---|
| caught | awl | bought | cob | quad |
| cause | brawn | brought | dog | qualify |
| daughter | caw | cough | doll | quality |
| fraud | claw | cougher | flog | qualm |
| fraught | craw | fought | hot | quantity |
| launch | crawl | hough | job | quash |
| launder | flaw | nought | log | squab |
| laundry | jaw | ought | moss | squabble |

| laurel | lawn | oughtness | mock | squadron |
|--------|------|-----------|------|----------|
| naught | scrawl | sought | not | squall |
| Paul | shawl | thought | rod | squalor |
| pauper | sprawl | trough | shock | squalid |
| plausible | saw | | shot | squashy |
| sauce | straw | | stock | squat |
| taught | thaw | | trot | |

CATEGORY III A

Figure 16:
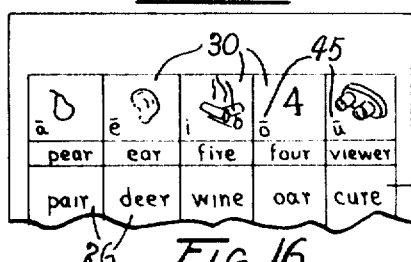

In the normal course of events, a following level of difficulty to which a student will advance in developing perceptual skills, employing the game of the instant invention involves a use of the letter patterns denoting a common sound of phoneme. These may be called the "long vowel" patterning of the basic murmur diphthongs, and while these may not have the identical spelling to provide the particular sounds, it is necessary to provide opportunity to observe the various spellings which spell a common phoneme, or sound. The phonemes inherent in this herein designated Category III A are categorized into long vowel sounds, "a," "e," "i," "o" and "u," and are illustrated by the card 24 of FIG. 16.

| ā | ē | ī | ō | ū |
|---|---|---|---|---|
| dare | bier | dire | boar | cure |
| fare | deer | fire | bore | doer |
| hare | drear | flier | core | fewer |
| heir | fear | flyer | door | hewer |
| pair | gear | higher | for | lure |
| scare | here | hire | four | moor |
| snare | pier | liar | lore | newer |
| spare | seer | mire | more | poor |
| stair | skier | pyre | oar | pure |
| stare | spear | spire | pore | sewer |
| tear | steer | tire | snore | skewer |
| their | tear | wire | spore | spoor |
| there | tier | | sore | sure |
| wear | veer | | tore | truer |
| where | weir | | wore | viewer |

CATEGORY III B

Figure 17:
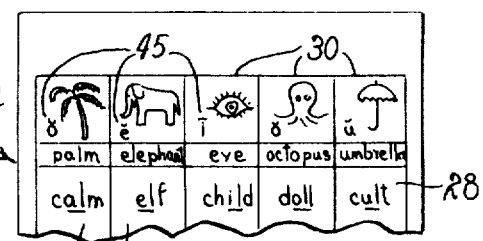

Another step of progression in difficulty of letter pattern perception involves a use of letter patterns which, in common, include medial vowels attached to ending consonant combinations which include the letter "l." This category of patterns is hereinafter designated Category III B, and is illustrated by the card 24, FIG. 17. This category of letter patterns is designed primarily to acquaint a beginning reader with the sound of the vowel "a" and the deviate or changing sounds of "i" and "o," when combined with the letter ending "l." Additionally, this category can be employed in demonstrating the "el" and "ul" sounds.

Category III B letter patterns also are employed in the manner aforedescribed. The following is a list of words which includes letter patterns representative of Category III B words:

| a | ĕ | ī—ĭ | ō—ŏ | ŭ |
|---|---|-----|-----|---|
| bald | belt | bilk | bold | bulge |
| balk | elf | build | bolt | bulk |
| balm | felt | built | doll | bull |
| call | held | child | folk | could |
| calm | helm | fill | golf | cult |
| chalk | help | film | hold | dull |
| halt | kelp | guild | jolt | gulf |
| malt | meld | guilt | loll | gull |
| palm | melt | mild | molt | gulp |
| salt | pelt | silk | poll | hulk |
| scald | shelf | stilt | roll | hull |
| scalp | shelve | wild | scold | lull |
| stalk | tell | | sold | pull |
| talk | weld | | toll | sulk |
| walk | welt | | yolk | would |

CATEGORY III C

In the normal course of events, a following level of difficulty to which a student will advance in developing perceptual skills, employing the game of the instant invention involves a use of the letter patterns having a common characteristic of the phonetic values assigned to "diphthongs."

Figure 18:
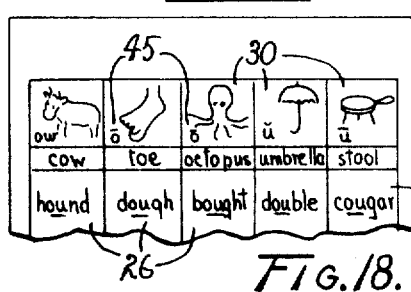

Diphthongs are letter patterns including two letters providing a compound phonetic value. Quite frequently, the letter pattern includes the two vowels "o" and "u" taken together. Such patterns are herein designated Category III C and are illustrated by the card 24 of FIG. 18.

The following comprises a list of words including Category III C words:

| ow | ō | ŏ | ŭ | ū |
|----|---|---|---|---|
| bough | boulder | bought | callous | cougar |
| doubt | course | cough | country | coup |
| drought | court | cougher | couple | coupon |
| foul | dough | fought | double | dour |
| hound | doughy | hough | doublet | rouge |
| hour | four | nought | doubloon | route |
| house | fourth | ought | enough | scourge |
| jounce | gourd | oughtness | joust | slough |
| mouse | moult | sought | rough | soup |
| noun | poultry | thought | slough | through |
| plough | shoulder | trough | touch | tour |
| proud | smoulder | wrought | tough | troupe |
| shout | soul | | trouble | wound |
| sour | source | | troubled | you |
| wound | though | | young | youth |

These patterns are employed in the manner aforedescribed.

The hereinbefore discussed Categories I A through III C of letter patterns are not deemed to be exclusive. Other combinations of letter patterns can be employed in the manner similar to the manner hereinbefore discussed, to provide even more sophisticated letter patterns, which, in turn, can be employed as a base for developing even additional categories of letter patterns. The particular category employed, its level of sophistication, and the specific order of its use will, in part, be determined by the level of the student's attained skill or deficiency to be corrected.

It also is quite important to understand that the game of the instant invention is deemed to serve as a teaching aid and is employed with teaching methods currently in use. However, the game readily is available for immediate application, regardless of the level of skill acquired by the student.

In view of the foregoing, it should readily be appreciated that the game which embodies the principles of the instant invention includes means for accommodating performance of a progressively difficult series of similar exercises, each requiring perception of selected letter patterns, particularly vowels, for approaching a phonetic analysis of words in a simplified, systematic and precise manner for thereby accelerating the rate of a student's recognition and comprehension of words and associated linguistic skills.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An instructional game for use in developing reading skill utilizing phonetic analysis, comprising:

A. a master board bearing indicia representing a compilation of words selected from a single class of words, said class being characterized by words having letters arranged in a common letter pattern of consonants and vowels for establishing multiple phonetic values, said words appearing on one face of the board in multiple parallel rows with the phonetic value for the letter pattern of the words of each row differing from the phonetic value for the letter pattern of the words of all other rows;

B. a plurality of game cards, each card including thereon indicia representing words selected from said master board and appearing on one face of the card in multiple parallel rows, with the phonetic value for the letter pattern of consonants and vowels of the words of each row differing from the phonetic value for the letter pattern of consonants and vowels of the words of all other rows; and C. indicator means for selectively marking the words appearing on each of said game cards, whereby a notation of the presence of words selected from said compilation of words and appearing on said game cards is facilitated.

2. The game of claim 1 further comprising a plurality of sight cards, each of said cards being characterized by indicia representing a word selected from said compilation of words.

3. The game of claim 1 wherein each row of words appearing on said master board and on each of said game cards is surmounted by an indicia representing a word including a letter pattern having a phonetic value common to the words of the row.

4. The game of claim 2 wherein the indicia representing a word borne by the sight card includes a pictorial representation of a word including a letter pattern having a predetermined phonetic value.

5. The game of claim 3 wherein said indicia representing said word including a letter pattern having a phonetic value common to the words of the row includes a pictorial illustration of the word.

6. The game of claim 5 further comprising a plurality of game boards, each comprising a substantially rigid, planar plate having means defining in one face thereof a plurality of mutually spaced openings arranged in parallel rows, means for receiving one of said game cards with each word of each row disposed in registry with one opening of said plurality of openings, whereby the words are displayed through said openings.

7. The game of claim 6 wherein said master board and each of said game boards include means defining therein a plurality of elongated slots, and said indicator means comprises slidably supported markers seated in said slots, whereby digitation of said markers is facilitated.

8. The game of claim 1 wherein the letter pattern includes a short vowel in combination with an initial consonant.

9. The game of claim 1 wherein the letter pattern includes a short medial vowel in combination with initial and ending consonants.

10. The game of claim 1 wherein the letter pattern includes an initial consonant blend with a medial short vowel, whereby the phonetic value of the letter pattern includes the sound of the initial consonant blended with that of the short vowel.

11. THe game of claim 1 wherein the letter pattern includes a consonant digraph.

12. The game of claim 1 wherein the letter pattern includes a vowel diagraph.

13. The game of claim 1 wherein the letter pattern includes a murmur dipthong.

14. The game of claim 1 wherein the letter pattern includes a vowel digraph having a first succession of orthographic letters and a sound of a vowel digraph including a second succession of orthographic letters.

15. The game of claim 1 wherein the letter pattern includes a medial vowel separated by a consonant from an ending silent "e," whereby the phonetic value for the medial vowel is that of a long vowel.

16. The game of claim 1 wherein the letter pattern includes the phoneme "ah."

17. The game of claim 1 wherein the letter pattern includes a true murmur-dipthong phoneme.

18. The game of claim 1 wherein the letter pattern includes a medial vowel attached to an ending combination of consonants including a letter "*l.*"

19. The game of claim 1 wherein the letter pattern includes a dipthong.

* * * * *

UNITED STATES PATENT OFFICE
CERTIFICATE OF CORRECTION

Patent No. 3,665,618    Dated May 30, 1972

Inventor(s) Margaret K. Hahn

It is certified that error appears in the above-identified patent and that said Letters Patent are hereby corrected as shown below:

Column 12, line 18, "dipthong" should be changed to ---diphthong---.

Column 12, line 31, "dipthong" should be changed to ---diphthong---.

Column 12, line 36, "dipthong" should be changed to ---diphthong---.

Signed and sealed this 10th day of October 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,665,618          Dated May 30, 1972

Inventor(s) Margaret K. Hahn

It is certified that error appears in the above-identified patent and that said Letters Patent are hereby corrected as shown below:

Column 1, line 30, "works" should be changed to ---words---.

Column 1, line 35, "lock" should be changed to ---lack---.

Column 3, line 7, "identified " should be changed to ---identifies---.

Column 6, line 53, "diagraphs" should be changed to ---digraphs---.

Column 7, line 10, "diagraphs" should be changed to ---digraphs---.

Column 12, line 16, "diagraph" should be changed to ---digraph---.

Signed and sealed this 3rd day of April 1973.

(SEAL)
Attest:

EDWARD M. FLETCHER, JR.　　　　　ROBERT GOTTSCHALK
Attesting Officer　　　　　　　　　Commissioner of Patents